United States Patent
Fratila et al.

(10) Patent No.: US 12,034,338 B2
(45) Date of Patent: Jul. 9, 2024

(54) ROTARY ELECTRICAL MACHINE WITH A ROTOR CONFIGURATION WHICH REDUCES THE TORQUE RIPPLES

(71) Applicant: Valeo Equipements Electriques Moteur, Creteil (FR)

(72) Inventors: Radu Fratila, Creteil (FR); Adham Kaloun, Creteil (FR)

(73) Assignee: Valeo Equipements Electriques Moteur, Creteil (FR)

(*) Notice: Subject to any disclaimer, the term of this patent is extended or adjusted under 35 U.S.C. 154(b) by 671 days.

(21) Appl. No.: 17/254,614

(22) PCT Filed: Jun. 25, 2019

(86) PCT No.: PCT/FR2019/051565
§ 371 (c)(1),
(2) Date: Dec. 21, 2020

(87) PCT Pub. No.: WO2020/002827
PCT Pub. Date: Jan. 2, 2020

(65) Prior Publication Data
US 2021/0119506 A1 Apr. 22, 2021

(30) Foreign Application Priority Data
Jun. 25, 2018 (FR) .................................... 1855653

(51) Int. Cl.
*H02K 1/27* (2022.01)
*H02K 1/276* (2022.01)
(Continued)

(52) U.S. Cl.
CPC ........... *H02K 1/2766* (2013.01); *H02K 21/14* (2013.01); *H02K 29/03* (2013.01); *H02K 2213/03* (2013.01)

(58) Field of Classification Search
CPC ...... H02K 1/2766; H02K 21/14; H02K 29/03; H02K 2213/03
See application file for complete search history.

(56) References Cited

U.S. PATENT DOCUMENTS

| | | | |
|---|---|---|---|
| 2002/0047432 A1* | 4/2002 | Miyashita | H02K 21/14 310/156.48 |
| 2011/0031843 A1* | 2/2011 | Liang | H02K 1/2773 310/216.096 |

(Continued)

FOREIGN PATENT DOCUMENTS

| | | |
|---|---|---|
| DE | 102013219067 A1 * | 4/2014 |
| EP | 1450462 A1 * | 8/2004 |

(Continued)

OTHER PUBLICATIONS

International Search Report and Written Opinion in corresponding International Application No. PCT/FR2019/051565, mailed Oct. 10, 2019 (12 pages).

*Primary Examiner* — Thomas Truong
(74) *Attorney, Agent, or Firm* — Osha Bergman Watanabe & Burton LLP

(57) ABSTRACT

The invention pertains primarily to a rotary electric machine, in particular for a motor vehicle, including: —a stator comprising a body provided with teeth delimiting slots and a winding that is housed in the slots of the stator body; —a rotor (12) comprising a body (21) and poles (22) that are formed by permanent magnets (23), characterized in that —two successive polar angles, each corresponding to a circumferential extent of a pole (22), or —two successive dual polar angles (A0-A4), each corresponding to a circumferential extent of two adjacent poles (22), —exhibit an angular difference in relation to one another that is dependent on an angular offset parameter (6) related to a stator pitch.

18 Claims, 6 Drawing Sheets

(51) Int. Cl.
*H02K 21/14* (2006.01)
*H02K 29/03* (2006.01)

(56) References Cited

U.S. PATENT DOCUMENTS

| | | | | |
|---|---|---|---|---|
| 2011/0285239 | A1* | 11/2011 | Leonardi | H02K 29/03 310/156.53 |
| 2014/0333168 | A1* | 11/2014 | Bouarroudj | H02K 1/2773 310/156.56 |
| 2017/0366056 | A1* | 12/2017 | Tang | H02K 1/2766 |
| 2018/0342918 | A1* | 11/2018 | Hino | H02K 3/12 |

FOREIGN PATENT DOCUMENTS

| | | | |
|---|---|---|---|
| EP | 2131475 | A2 * | 12/2009 |
| GB | 2508971 | A | 6/2014 |
| JP | 2010183648 | A * | 8/2010 |

\* cited by examiner

ROTARY ELECTRICAL MACHINE WITH A ROTOR CONFIGURATION WHICH REDUCES THE TORQUE RIPPLES

The invention relates to a rotary electrical machine with a rotor configuration which reduces the torque ripples. The invention has a particularly advantageous, but non-exclusive application with rotary electrical machines which are used in motor vehicles.

In a known manner, rotary electrical machines comprise a stator and a rotor integral with a shaft. The rotor can be integral with a driving and/or driven shaft, and can belong to a rotary electrical machine in the form of an alternator, an electric motor, or a reversible machine which can operate in both modes.

The rotor comprises a body formed by a stack of metal plate sheets which are retained in the form of a set by means of an appropriate securing system. The rotor comprises poles formed by permanent magnets accommodated in cavities provided in the rotor body.

In addition, the rotor is fitted in a housing which is configured to rotate the rotor shaft, for example by means of roller bearings. The stator comprises a body provided with a plurality of teeth defining notches, and a winding inserted in the notches of the stator. The winding is obtained for example from continuous wires covered with enamel, or from conductive elements in the form of pins which are connected to one another by welding.

In the case of a stator comprising at least one group of three-phase windings used in combination with a rotor provided with poles formed by embedded magnets, torque ripples which are detrimental to the performance of the electrical machine are observed.

The objective of the invention is to eliminate this disadvantage efficiently by proposing a rotary electrical machine, in particular for motor vehicles, comprising:
- a stator comprising a body provided with teeth delimiting notches, and a winding accommodated in the notches of the stator body;
- a rotor comprising a body and poles formed by permanent magnets, characterised in that:
- two successive polar angles each corresponding to a circumferential extent of a pole; or
- two successive double polar angles each corresponding to a circumferential extent of two adjacent poles,
- have an angular difference[1] from one another which depends on an angular offsetting parameter associated with a stator pitch.

[1] Translator's note: The word "écart" is rendered as "difference" in the previously translated Abstract, and the same term has also been used in the present translation of the Description and Claims. However, it can also mean "distance". It is not clear from the drawings which term would be the most appropriate one in this case.

Thanks to the introduction of the angular difference between two polar angles or between two successive double polar angles, the invention makes it possible to compensate for the effect of distortion of the rotor field (rotor skewing) in order to reduce the torque ripples, and without technical limitation associated in particular with problems of leakage of flux. The invention also has the advantage of not increasing excessively the duration of development, since the calculations and simulations can be carried out in two dimensions.

According to one embodiment, the angular offsetting parameter is contained between 0.5 and 1.5 times the stator pitch.

According to one embodiment, a double polar angle is defined by the following equation:

$$Ax = 360/P - \delta/2 + x^*\delta/(P-1)$$

x being the rank of the double polar angle, i.e. a whole number contained between 0 and P−1;
P being the number of pairs of poles;
δ being the angular offsetting parameter.

According to one embodiment, a polar angle is defined by the following equation:

$$Ax' = 180/P - \delta/2 + x^*\delta/(2P-1)$$

x being the rank of the polar angle, i.e. a whole number contained between 0 and 2P−1;
P being the number of pairs of poles;
δ being the angular offsetting parameter.

According to one embodiment, the rank of the double polar angle or of the polar angle increases when going in a given direction of travel according to a circumference of the rotor.

According to one embodiment, each pole is formed by two permanent magnets having a form in the shape of a "V".

According to one embodiment, each pole is formed by a permanent magnet which is oriented orthoradially relative to an axis of the rotor.

According to one embodiment, a number of notches per pole and per phase is contained between 1 and 3.

According to one embodiment, a number of pairs of poles is contained between 3 and 10.

According to one embodiment, the winding comprises a number of phases contained between 3 and 6.

The invention will be better understood by reading the following description and examining the figures which accompany it. These figures are provided purely by way of illustration and in no way limit the invention.

Figure 3A:
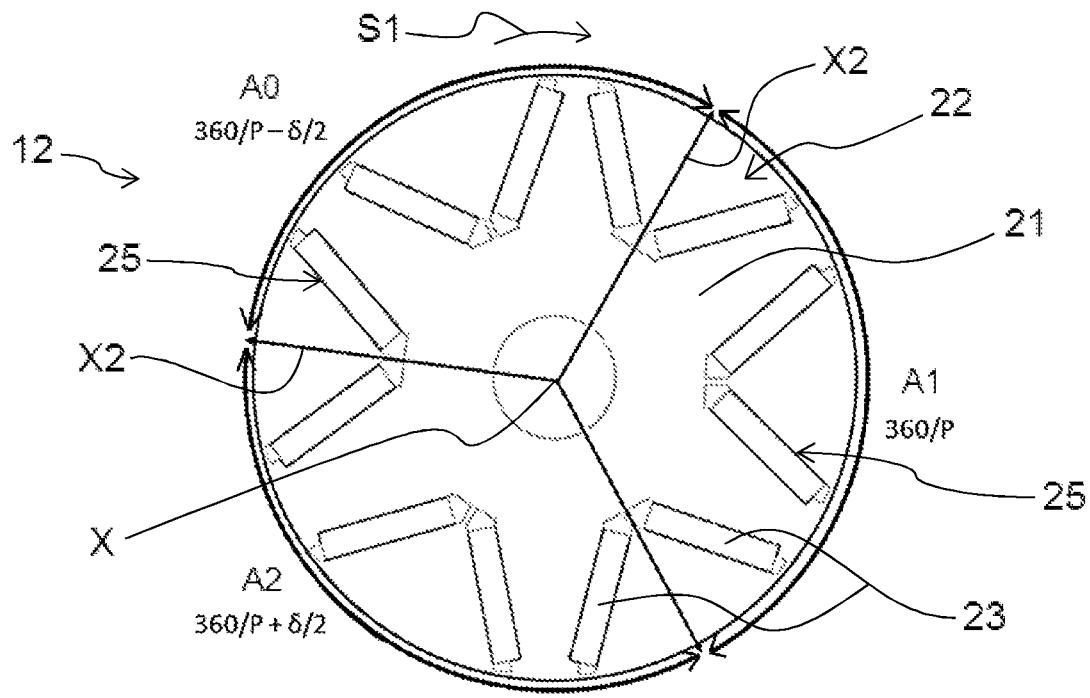
Figure 3B:
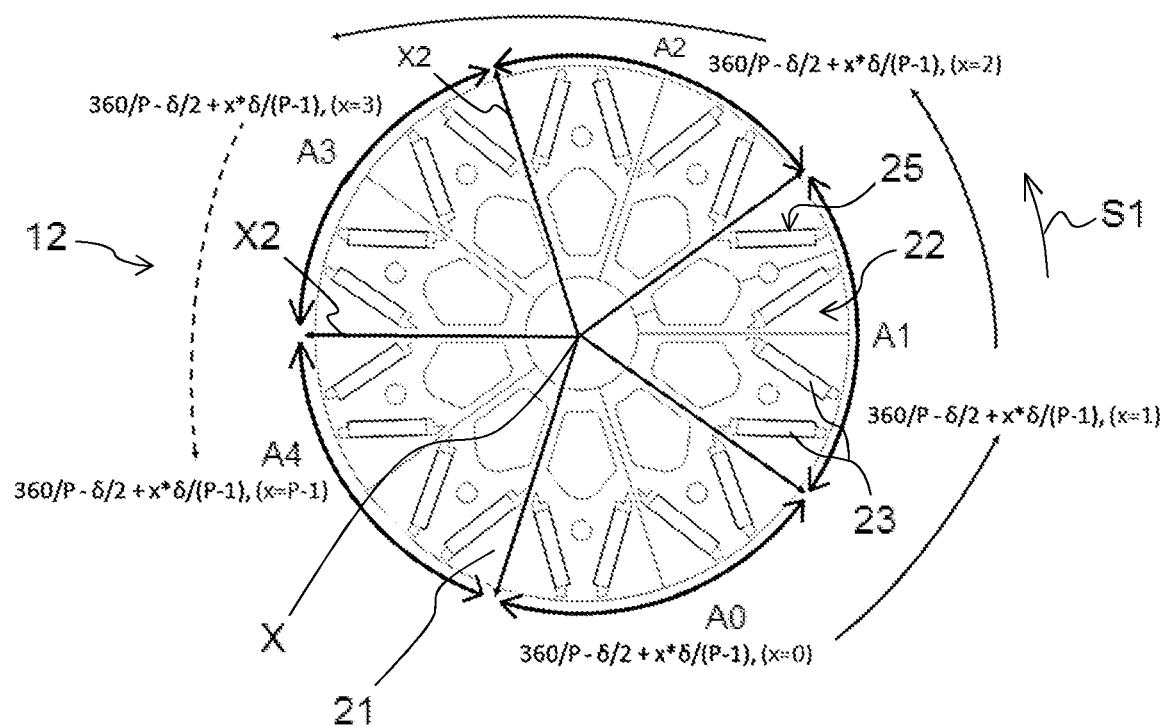
Figure 4A:
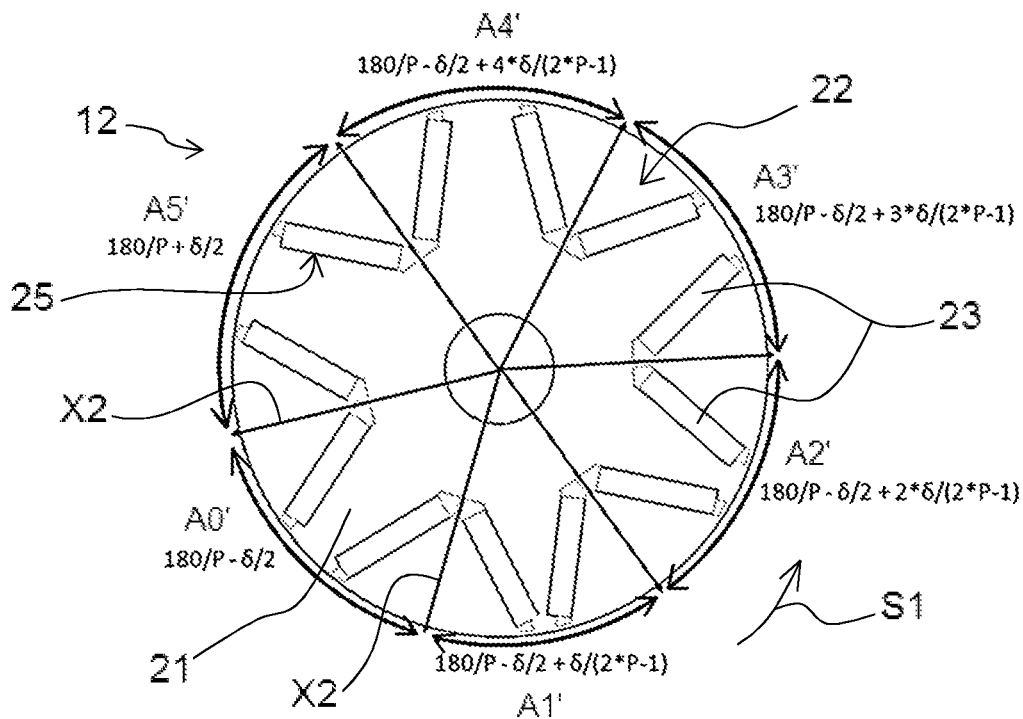
Figure 4B:
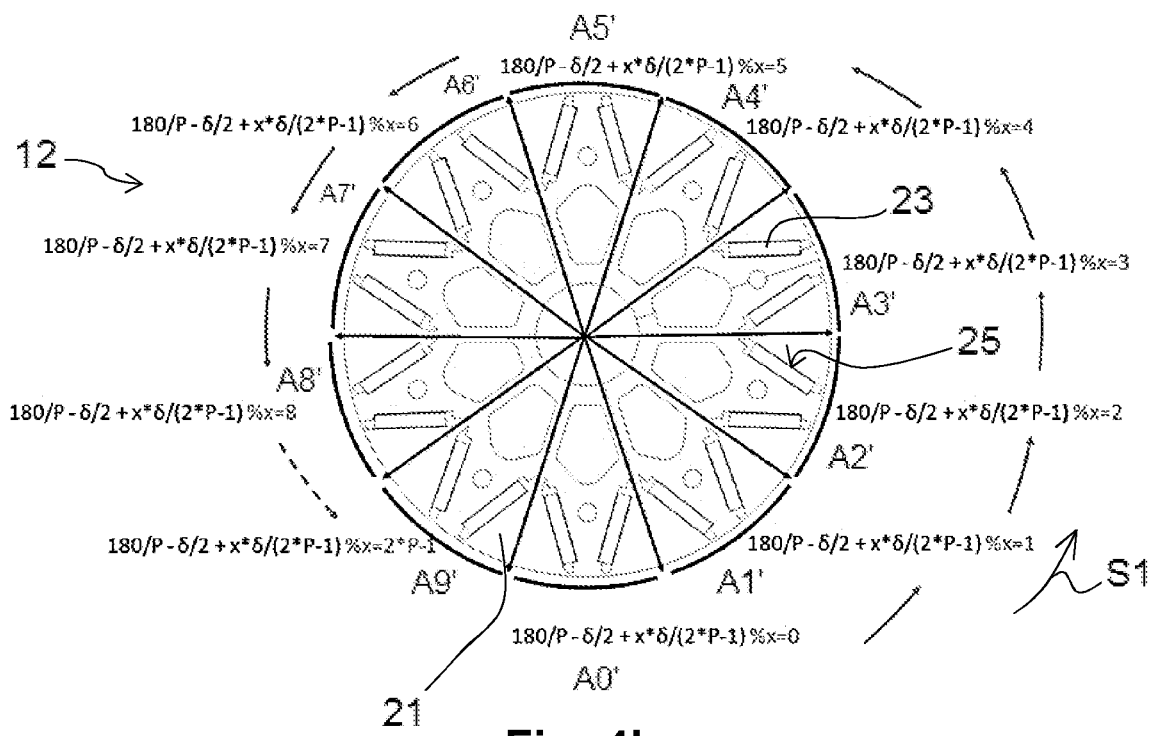
Figure 5A:
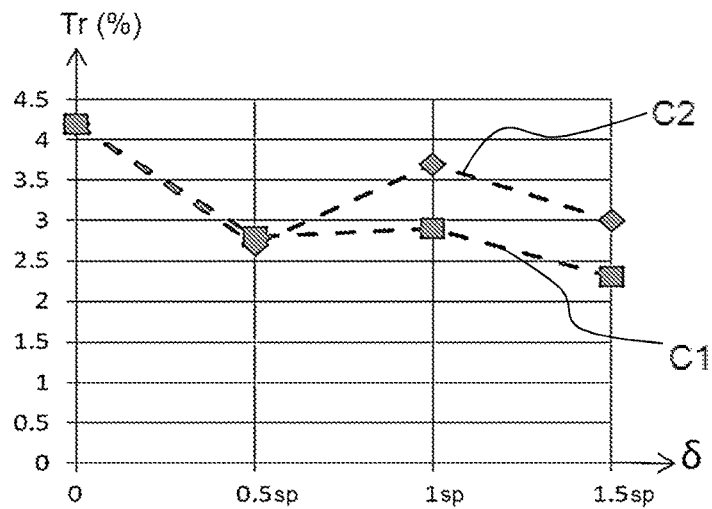
Figure 5B:
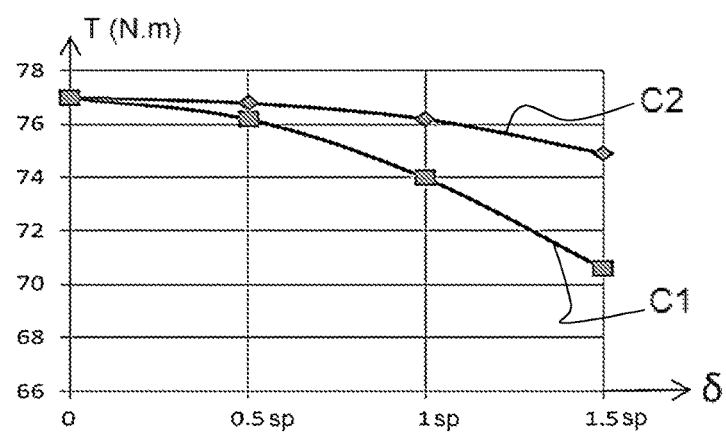
Figure 5C:
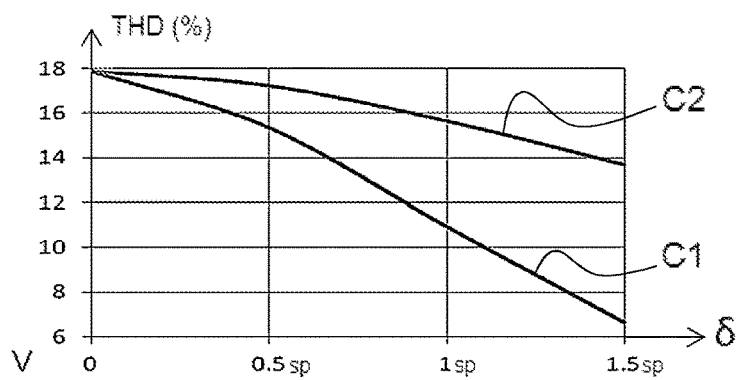
Figure 5D:
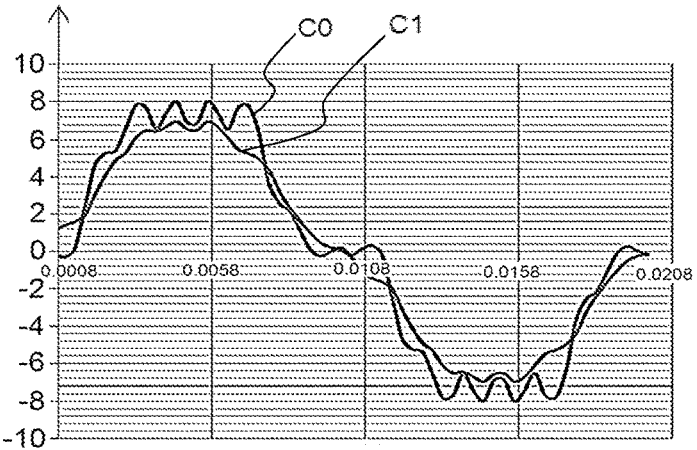
Figure 6:
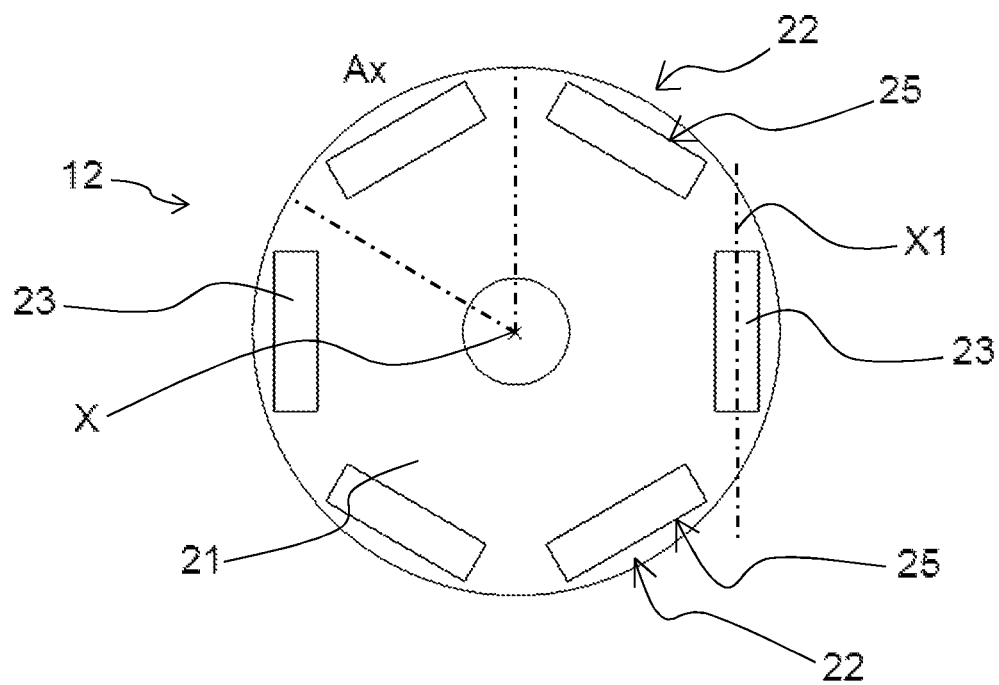
Figure 7A:
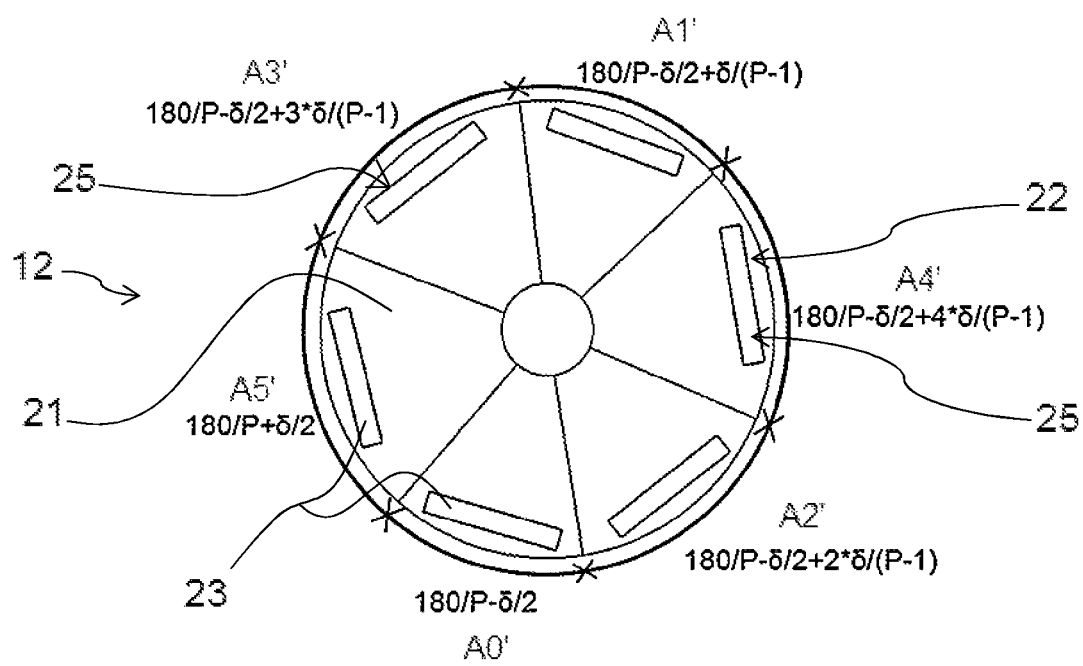
Figure 7B:
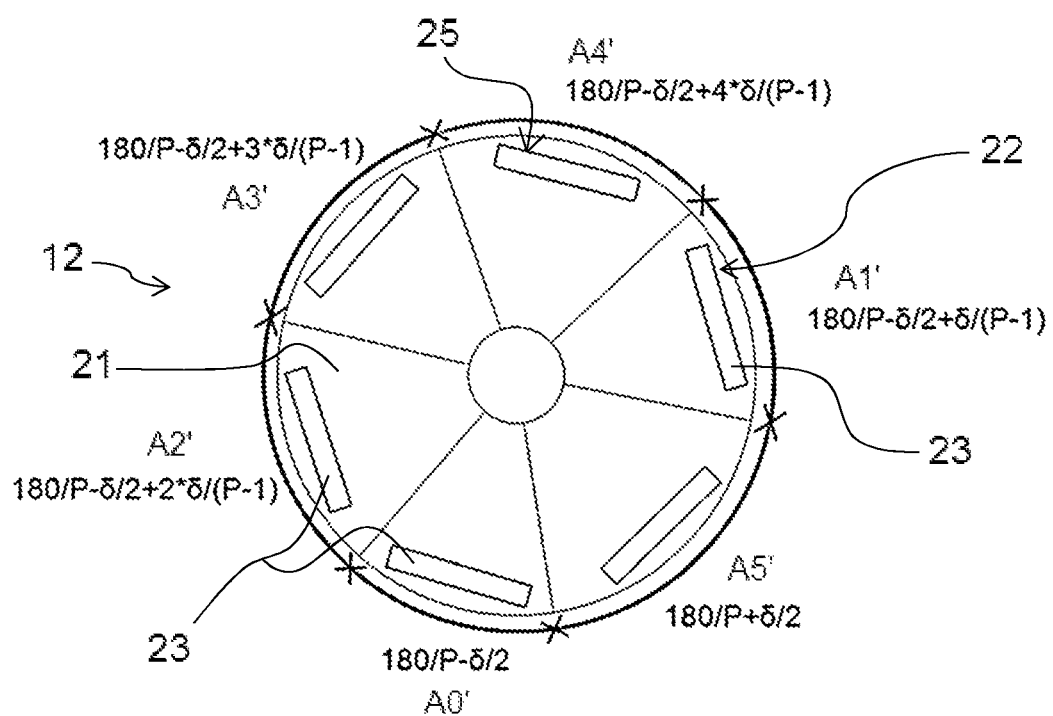

FIGS. 3a and 3b illustrate the introduction of angular offsetting between two successive double polar angles, respectively for a rotor with 3 pairs of poles and with 5 pairs of poles;

FIGS. 4a and 4b illustrate the introduction of angular offsetting between two successive polar angles respectively for a rotor with 3 pairs of poles and with 5 pairs of poles;

FIGS. 5a to 5c show respectively the development of the torque ripples, of the torque, and of the total harmonic distortions according to the angular offsetting parameter, respectively for polar angular offsetting and angular offsetting in a pair of poles;

FIG. 5d is a graphic representation of a no-load voltage of the electrical machine obtained respectively for a conventional rotor and for a rotor incorporating angular offsetting between two successive polar angles;

FIG. 6 shows a variant embodiment of the rotor according to the invention provided with magnets oriented orthoradially;

FIGS. 7a and 7b are views illustrating the introduction of an angular offsetting parameter selected randomly.

Elements which are identical, similar or analogous retain the same reference from one figure to another.

Figure 1:
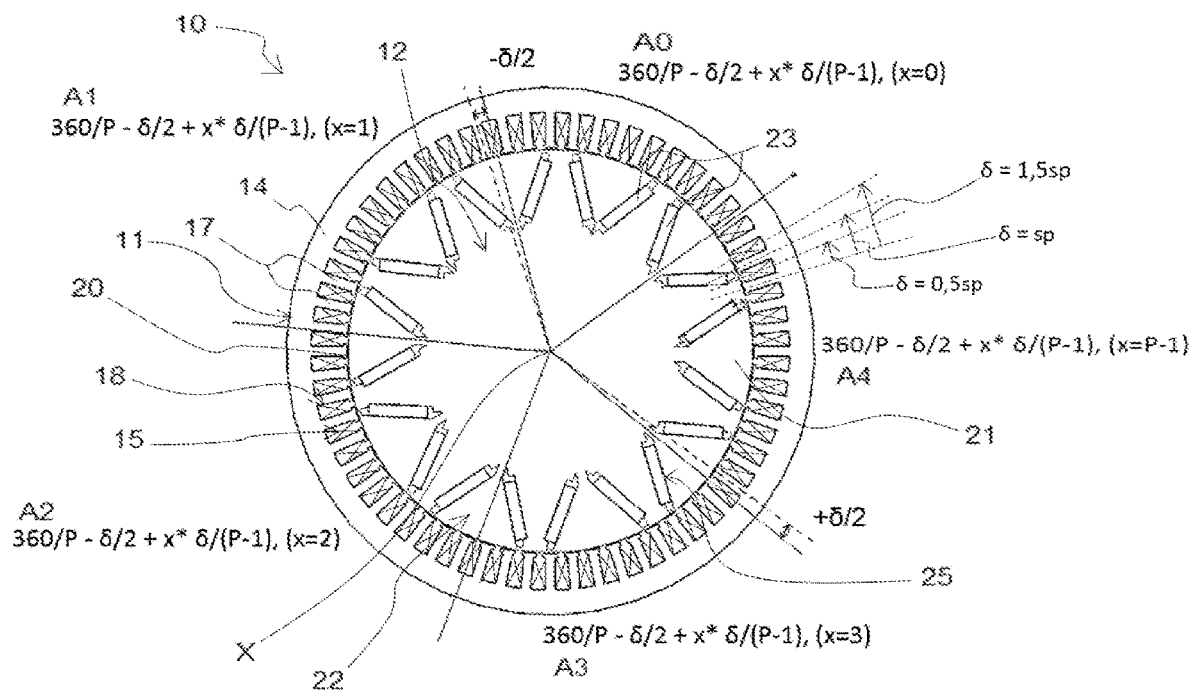
FIG. 1 is a view in transverse cross-section of the rotary electrical machine according to the invention.

FIG. 1 shows a rotary electrical machine 10 comprising a wound stator 11, which can be polyphase, surrounding coaxially a rotor 12 with an axis of rotation X. The stator 11 and the rotor 12 are separated from one another by an air gap extending between the outer periphery of the rotor 12 and the inner periphery of the stator 11.

More specifically, the stator 11 comprises a body 14 and a winding 15 represented schematically by crosses. The stator body 14 consists of an axial stack of flat metal plates. The body 14 comprises teeth 17 which are distributed angularly regularly. These teeth 17 delimit notches 18, such that each notch 18 is delimited by two successive teeth 17. The notches 18 open axially into the axial end faces of the body 14. The notches 18 are also open radially towards the interior of the body 14.

The stator 11 is provided with tooth roots 20 on the side of the free ends of the teeth 17. Each tooth root 20 extends circumferentially on both sides of a corresponding tooth 17.

The winding 15 which is accommodated in the notches 18 is obtained for example from continuous wires covered with enamel, or from conductive elements in the form of pins which are connected to one another by welding.

The winding 15 comprises a number of phases contained between 3 and 6. A number of 18 notches per pole and per phase is preferably strictly greater than 1 and equal to or less than, 3.

Figure 2:
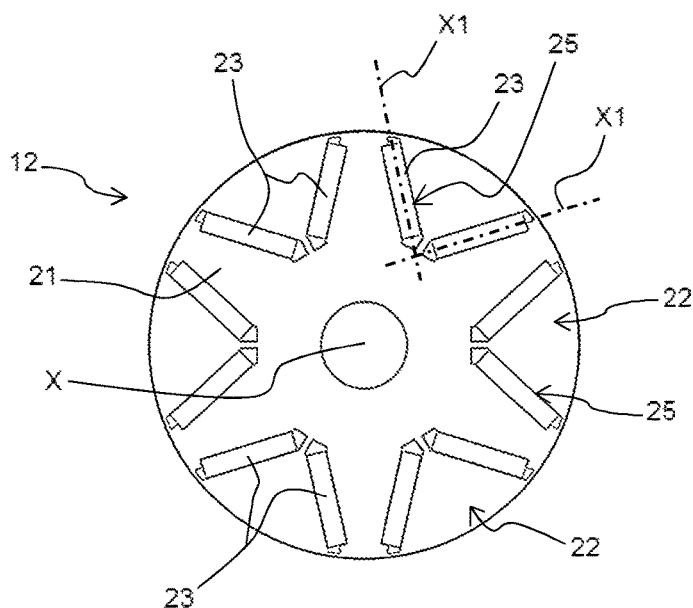
FIG. 2 shows a rotor belonging to the rotary electrical machine according to the invention.

In addition, as can be seen in FIG. 2, the rotor 12 with an axis X comprises a body 21 formed by an axial stack of flat metal plates, in order to decrease the Foucault currents. The body 21 is made of a magnetic material.

The rotor 12 also comprises poles 22 formed by at least two permanent magnets 23, which in cross-section define a form in the shape of a "V". These magnets 23 are disposed in the interior of corresponding cavities 25.

"Form in the shape of a "V"" means the fact that, in transverse cross-section, the longitudinal axes X1 of at least one assembly of two magnets 23 of the pole 22 form a non-zero angle between one another. The cavities 25 which are associated with a pole 22 are in this case distinct from one another. As a variant, the cavities 25 could join one another at the tip of the "V".

The permanent magnets 23 can be made of ferrite or rare earth depending on the applications and the power required from the machine. As a variant, the permanent magnets 23 can be of a different grade in order to reduce the costs.

In the embodiment in FIGS. 3a and 3b, two successive double polar angles Ax each corresponding to a circumferential extent of two adjacent poles 22 have an angular difference from one another which depends on an angular offsetting parameter associated with a stator pitch.

The angle Ax is measured between two axes of symmetry X2 of a pole which are separated from one another by a pole 22.

A stator pitch, abbreviated to "sp" for "slot pitch"[2] is defined as being equal to 360 divided by the number of teeth 17 of the stator 11. The angular offsetting parameter δ is contained between 0.5 and 1.5 times the stator pitch sp. FIG. 1 thus shows a parameter δ with a value respectively of half the stator pitch (δ=0.5 sp), the stator pitch sp (δ=sp), and 1.5 times the stator pitch (δ=1.5 sp).

[2] Translator's note: There seems to be some confusion here about the term "slot pitch" which is given in English in the French text, and which, according to the French text means the same thing as "pas statorique" in French. In fact, "pas statorique" means "stator pitch", and the French translation of "slot pitch" would be "pas des encoches". The translation has been rendered literally, as it stands.

In this case, a double polar angle Ax is defined by the following equation:

$$Ax=360/P-\delta/2+x*\delta/(P-1)$$

x being the rank of the double polar angle, i.e. a whole number contained between 0 and P−1;

P being the number of pair of poles 22 of the rotor 12, which in particular can be contained between 3 and 10;

δ being the angular offsetting parameter.

The rank x of the double polar angle Ax increases when going in a given direction of travel S1 according to a circumference of the rotor 12. For example, a first angle A0 is selected for which x equals 0, the second angle A1 which is encountered in the direction of travel S1 corresponds to X equals 1, the third angle A2 which is encountered in the direction of travel S1 corresponds to x equals 2, and so on, until the final angle A(P−1), for which x equals P−1. The direction of travel S1 can be selected in the clockwise or anticlockwise direction.

FIG. 3a shows an embodiment for a rotor 12 with three pair of poles (P=3), whereas FIGS. 1 and 3b show an embodiment for a rotor 12 having five pairs of poles (P=5). Thus, the first angle A0 has a value of 360/P−δ/2 and the final angle A(P−1) has a value of 360/P−δ/2, with the intermediate angles Ax varying by a mechanical angle which depends on the angular offsetting parameter δ, i.e. by a value of x*δ(P−1).

In the embodiment in FIGS. 4a and 4b, two successive polar angles Ax' each corresponding to a circumferential extent of a pole 22 have an angular difference relative to one another which depends on the angular offsetting parameter δ associated with the stator pitch sp. The angle Ax' is measured between two successive axes of symmetry X2 of two adjacent poles 22.

In this case, a polar angle Ax' is defined by the following equation:

$$Ax'=180/P-\delta/2+x\delta/(P-1)$$

x being the rank of the polar angle, i.e. a whole number contained between 0 and 2P−1;

P being the number of pairs of poles 22;

δ being the angular offsetting parameter.

The rank x of the polar angle Ax' increases when going in a given direction of travel S1 according to a circumference of the rotor 12. For example, a first angle A0' is selected for which x equals 0, the second angle A1' which is encountered in the direction of travel S1 corresponds to x equals 1, the third angle A2' which is encountered in the direction of travel S1 corresponds to x equals 2, and so on, until the final angle, for which x equals 2P−1. The direction of travel S1 can be selected in the clockwise or anticlockwise direction.

FIGS. 5a to 5c show respectively the development of the torque ripples Tr, of the torque T, and of the total harmonic distortions THD depending on the angular offsetting parameter δ respectively for polar angular offsetting (cf. curves C1), or angular offsetting in a pair of poles (cf. curves C2). These curves have been obtained for a machine with three pairs of poles, 54 notches and a double three-phase winding with pins with a maximum torque of 1000 rpm. It should be noted that the value δ=0 corresponds to a conventional rotor with symmetrical poles.

It can be observed that the saving in terms of torque ripple reduction Tr and total harmonic distortion THD is significant starting from an angular offsetting parameter value δ equal to 0.5 sp.

FIG. 5d also shows that the no-load voltage obtained with the rotor 12 according to the invention is more regular than with a conventional rotor 12 (cf. curve C0).

FIG. 6 shows a variant embodiment of the rotor 12 according to the invention provided with magnets 23 oriented orthoradially. Thus, in transverse cross-section, a longitudinal axis X1 of the magnet 23 is oriented orthoradially relative to the axis X of the rotor 12.

As a variant, each pole is formed by two permanent magnets which define a form in the shape of a "V" in cross-section, and an additional magnet which is oriented orthoradially relative to the axis X of the rotor 12.

As a variant, each pole is formed by two permanent magnets which define a form in the shape of a "V" in cross-section, and two other permanent magnets which define another form in the shape of a "V" in cross-section, which form is imbricated in the first form in the shape of a "V", i.e., in transverse cross-section, the longitudinal axes X1 of at least one assembly of the four magnets 23 of the pole 22 form a non-zero angle between one another.

In the case of the rotor 12 in FIG. 6, the torque ripples Tr have dropped from 11% to less than 4%, without significant reduction of the torque supplied (not illustrated). The total harmonic distortion THD is reduced by half compared with its initial value without angular offsetting (δ=0) (not illustrated).

FIGS. 7a and 7b are views illustrating the introduction of a polar angle Ax selected randomly. As is apparent from the table below, a random distribution also makes it possible to obtain improved performance levels of the electrical machine:

|  | Torque T (N · m) | Torque ripples Tr (%) | THD (%) |
| --- | --- | --- | --- |
| Initial case (δ = 0) | 37.3 | 11 | 23.4 |
| Case 1 (FIG. 7a) | 33.1 | 4.8 | 18.9 |
| Case 2 (FIG. 7b) | 33.1 | 3.7 | 20.8 |

Case 1 is based on the angular distribution of FIG. 7a, and case 2 is based on the angular distribution of FIG. 7b. The random distribution can be put into effect with different offsetting angle values varying between 0.5*sp and 1.5*sp. Case 1 and case 2 were obtained by selecting an angular offsetting parameter δ equal to 1.5 sp, and changing the rank of the angle randomly according to the circumference of the rotor 12. Thus, it will be possible to use the aforementioned equations making it possible to define the angles Ax and Ax' by taking a rank x with a random angle according to the direction of travel S1.

In FIG. 7a, the polar angle A'x previously defined is selected randomly, such that the angles A'0, A'1, A'2, A'3, A'4 and A'5 are distributed randomly on the circumference of the rotor. According to the direction of travel S1, the angles are in succession A'0, A'2, A'4, A'1, A'3, A'5.

In FIG. 7b, the random distribution of the polar angle A'x is such that, according to the direction of travel S2, the angles are in succession A', A'5, A'1, A'4, A'3, A'2.

It should be noted that the invention can be implemented independently of the direction of rotation of the rotor 12. In addition, the results obtained are the same irrespective of the operating mode of the rotary electrical machine 10, i.e. in motor mode or in generator mode.

It will be appreciated that the foregoing description has been provided purely by way of example, and does not limit the scope of the invention, a departure from which would not be constituted by replacing the different elements by any other equivalents.

In addition, the different characteristics, variants, and/or embodiments of the present invention can be associated with one another according to different combinations, provided that they are not incompatible or mutually exclusive.

The invention claimed is:

1. A rotary electrical machine for motor vehicles, comprising:
a stator comprising a stator body provided with teeth delimiting notches, and a winding accommodated in the notches of the stator body;
a rotor comprising a rotor body and poles formed by permanent magnets,
wherein two successive polar angles each corresponding to a circumferential extent of a pole, or two successive double polar angles each corresponding to a circumferential extent of two adjacent poles have an angular difference from one another which depends on an angular offsetting parameter associated with a stator pitch that is defined as being equal to 360 divided by a number of the teeth;
wherein a double polar angle of the two successive double polar angles is defined by the following equation:

$$Ax = 360/P - \delta/2 + x*\delta/(P-1)$$

x being the rank of the double polar angle, i.e. a whole number contained between 0 and P−1, P being the number of pairs of poles, and δ being the angular offsetting parameter.

2. The rotary electrical machine according to claim 1, wherein the angular offsetting parameter is contained between 0.5 and 1.5 times the stator pitch.

3. The rotary electrical machine according to claim 1, wherein a polar angle is defined by the following equation:

$$Ax' = 180/P - \delta/2 + x*\delta/(2P-1)$$

x being the rank of the polar angle, i.e. a whole number contained between 0 and 2P−1, P being the number of pairs of poles, and δ being the angular offsetting parameter.

4. The rotary electrical machine according to claim 1, wherein the rank of the double polar angle or of the polar angle increases when going in a given direction of travel according to a circumference of the rotor.

5. The rotary electrical machine according to claim 1, wherein each pole is formed by two permanent magnets having a form in the shape of a "V".

6. The rotary electrical machine according to claim 1, wherein each pole is formed by a permanent magnet which is oriented orthoradially relative to an axis of the rotor.

7. The rotary electrical machine according to claim 1, wherein a number of notches per pole and per phase is contained between 1 and 3.

8. The rotary electrical machine according to claim 1, wherein a number of pairs of poles is contained between 3 and 10.

9. The rotary electrical machine according to claim 1, wherein the winding comprises a number of phases contained between 3 and 6.

10. A rotary electrical machine for motor vehicles, comprising:
a stator comprising a stator body provided with teeth delimiting notches, and a winding accommodated in the notches of the stator body;
a rotor comprising a rotor body and poles formed by permanent magnets;
wherein two successive polar angles each corresponding to a circumferential extent of a pole, or two successive double polar angles each corresponding to a circumferential extent of two adjacent poles have an angular difference from one another which depends on an angular offsetting parameter associated with a stator pitch that is defined as being equal to 360 divided by a number of the teeth;

wherein a polar angle is defined by the following equation:

$$Ax = 180/P - \delta/2 + x*\delta/(2P-1)$$

x being the rank of the polar angle, i.e. a whole number contained between 0 and 2P−1, P being the number of pairs of poles, and δ being the angular offsetting parameter.

11. The rotary electrical machine according to claim 10, wherein a double polar angle of the two successive double polar angles is defined by the following equation:

$$Ax = 360/P - \delta/2 + x*\delta/(P-1)$$

x being the rank of the double polar angle, i.e. a whole number contained between 0 and P−1, P being the number of pairs of poles, and δ being the angular offsetting parameter.

12. The rotary electrical machine according to claim 10, wherein the angular offsetting parameter is contained between 0.5 and 1.5 times the stator pitch.

13. The rotary electrical machine according to claim 10, wherein the rank of the double polar angle or of the polar angle increases when going in a given direction of travel according to a circumference of the rotor.

14. The rotary electrical machine according to claim 10, wherein each pole is formed by two permanent magnets having a form in the shape of a "V".

15. The rotary electrical machine according to claim 10, wherein each pole is formed by a permanent magnet which is oriented orthoradially relative to an axis of the rotor.

16. The rotary electrical machine according to claim 10, wherein a number of notches per pole and per phase is contained between 1 and 3.

17. The rotary electrical machine according to claim 10, wherein a number of pairs of poles is contained between 3 and 10.

18. The rotary electrical machine according to claim 10, wherein the winding comprises a number of phases contained between 3 and 6.

* * * * *